United States Patent
Zaruba et al.

(10) Patent No.: US 12,149,575 B2
(45) Date of Patent: Nov. 19, 2024

(54) ENHANCED GATEWAY DEVICE AND SERVICE FOR STREAMING CONTENT

(71) Applicant: T-MOBILE INNOVATIONS LLC, Overland Park, KS (US)

(72) Inventors: Robert Ralph Zaruba, Overland Park, KS (US); George Jason Schnellbacher, Leawood, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/173,214

(22) Filed: Feb. 23, 2023

(65) Prior Publication Data

US 2024/0291878 A1    Aug. 29, 2024

(51) Int. Cl.
*H04L 65/60* (2022.01)
*H04L 65/1069* (2022.01)
*H04N 21/24* (2011.01)

(52) U.S. Cl.
CPC .......... *H04L 65/60* (2013.01); *H04L 65/1069* (2013.01); *H04N 21/24* (2013.01)

(58) Field of Classification Search
None
See application file for complete search history.

(56) References Cited

U.S. PATENT DOCUMENTS

| | | | | |
|---|---|---|---|---|
| 7,843,831 B2* | 11/2010 | Morrill | ............... | H04L 41/0668 370/235 |
| 7,986,686 B2* | 7/2011 | Nadeau | ............... | H04N 7/17336 709/227 |
| 10,498,442 B2* | 12/2019 | Bongaarts | ............. | H04L 65/611 |
| 11,251,866 B2* | 2/2022 | Bongaarts | ............... | H04L 67/06 |
| 11,540,131 B2* | 12/2022 | Farag | .................. | H04W 12/086 |
| 2006/0117341 A1 | 6/2006 | Park | | |
| 2007/0121612 A1* | 5/2007 | Nadeau | ............. | H04N 21/6408 370/386 |
| 2007/0250636 A1* | 10/2007 | Stephens | ............ | H04N 21/6125 709/233 |
| 2011/0238791 A1* | 9/2011 | Nadeau | ............. | H04N 21/6408 709/219 |
| 2011/0302236 A1* | 12/2011 | Shrum, Jr. | ......... | H04N 21/6582 709/203 |
| 2012/0079577 A1* | 3/2012 | Hao | .................. | H04N 21/64322 726/7 |
| 2012/0102184 A1* | 4/2012 | Candelore | .......... | H04N 21/6587 709/224 |
| 2012/0188878 A1* | 7/2012 | Simon | ..................... | H04W 4/06 370/312 |
| 2019/0116017 A1 | 4/2019 | Petruzzelli | | |
| 2020/0112369 A1* | 4/2020 | Bongaarts | ............. | H04W 28/02 |
| 2021/0345165 A1 | 11/2021 | Naik et al. | | |
| 2021/0352480 A1* | 11/2021 | Farag | .................... | H04W 88/16 |
| 2021/0377589 A1* | 12/2021 | Petruzzelli | ............. | H04L 67/02 |
| 2021/0410099 A1* | 12/2021 | Rahman | ................ | H04W 4/021 |

* cited by examiner

*Primary Examiner* — Ranodhi Serrao

(57) ABSTRACT

A gateway system comprising a digital streaming device and a gateway device coupled to the digital streaming device over a local area network (LAN). The gateway device is configured to provide an Internet connection to the digital streaming device and the digital streaming device obtains streamed content over the Internet connection. The gateway device is further configured to obtain a digital feed of content from a broadcast television signal, generate a local stream of the content based on the digital feed, and transmit the local stream to the digital streaming device over the LAN.

20 Claims, 15 Drawing Sheets

ENHANCED GATEWAY DEVICE AND SERVICE FOR STREAMING CONTENT

TECHNICAL FIELD

Aspects of the disclosure are related to the field of wireless telecommunication services and, in particular, to gateway devices and streaming content.

TECHNICAL BACKGROUND

Internet gateway devices, such as routers, modems, and other such equipment, provide Internet access to local devices connected via a local area network (LAN). For example, an in-home Internet gateway device may provide a wireless LAN over which mobile phones, laptops, and streaming devices connect to the gateway. The gateway device connects to an Internet service provider (ISP) network, allowing the local devices on the LAN to send and receive data to and from destinations on the Internet.

Wired connections such as coaxial cabling are often used to physically link gateway devices to the ISP network. However, wireless connections are becoming more prevalent, especially as their speed and reliability improve. For instance, many homes and businesses receive their Internet access via Fifth Generation (5G) wireless technology. A wireless gateway device provides a wireless LAN to locally connected devices, while connecting to the broader Internet over the ISP network. The local devices communicate with the wireless gateway in accordance with IEEE 802.11 standards (Wi-Fi), while the wireless gateway communicates with the ISP network in accordance with 5G or other such protocols.

The speeds provided by modern cellular telecommunications networks allow customers who receive their Internet via wireless gateways to stream video content into their homes and businesses. Popular applications include movie and television downloads, as well as other less-bandwidth intense applications such as email and web-browsing. Video content is often consumed in the context of applications (or "apps") running on streaming devices. An app on a streaming device obtains video content from a content provider on the Internet. The Internet traffic flows over various transit networks to an ISP that provides an Internet connection to the gateway. The ISP transmits the traffic wirelessly over a radio access network (RAN) to the gateway, and the gateway transmits the traffic on a LAN to the streaming device. The streaming device then plays out the content on a display screen or an attached display device.

Cellular networks become congested at times, reducing their capacity to carry streaming video at the speeds demanded by customers for certain types of content. For example, sporting events that are carried live over the Internet create simultaneous demand for wireless bandwidth because individual streams are transmitted by the content provider to each individual consumer of the content. This may stress or even exceed the capacity of the RAN serving multiple end-users because each video stream requires a relatively larger amount of bandwidth compared to other forms of content such as web pages, texts, or emails. This is especially the case in certain metro areas when locally popular teams drive demand for live content to levels that are far beyond normal traffic patterns. Such congestion may cause slow-downs, buffering, or other interruptions that negatively impact the streaming experience, while also limiting a network's ability to handle all other traffic.

OVERVIEW

Technology disclosed herein includes a gateway device capable of providing an Internet connection via a wireless telecommunications network to devices connected to the gateway device over a LAN. The gateway device is also capable of obtaining digital feeds of content from a broadcast television signal and streaming the content of the digital feed to the devices over the LAN.

In an implementation, a gateway device provides a wireless Internet connection to a streaming device connected to the gateway device over a LAN. The streaming device obtains streamed content over the Internet connection from a content provider. However, to mitigate the impact of streaming the content over the wireless telecommunications network, the gateway device obtains digital content from a broadcast television signal. The gateway device may then generate a local stream of the content and transmit the local stream to the streaming device over the LAN. In this manner, the gateway device conserves bandwidth and other such resources of the wireless telecommunications network and maintains the quality of the streaming experience.

This overview is provided to introduce a selection of concepts in a simplified form that are further described below in the Technical Disclosure. It may be understood that this overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
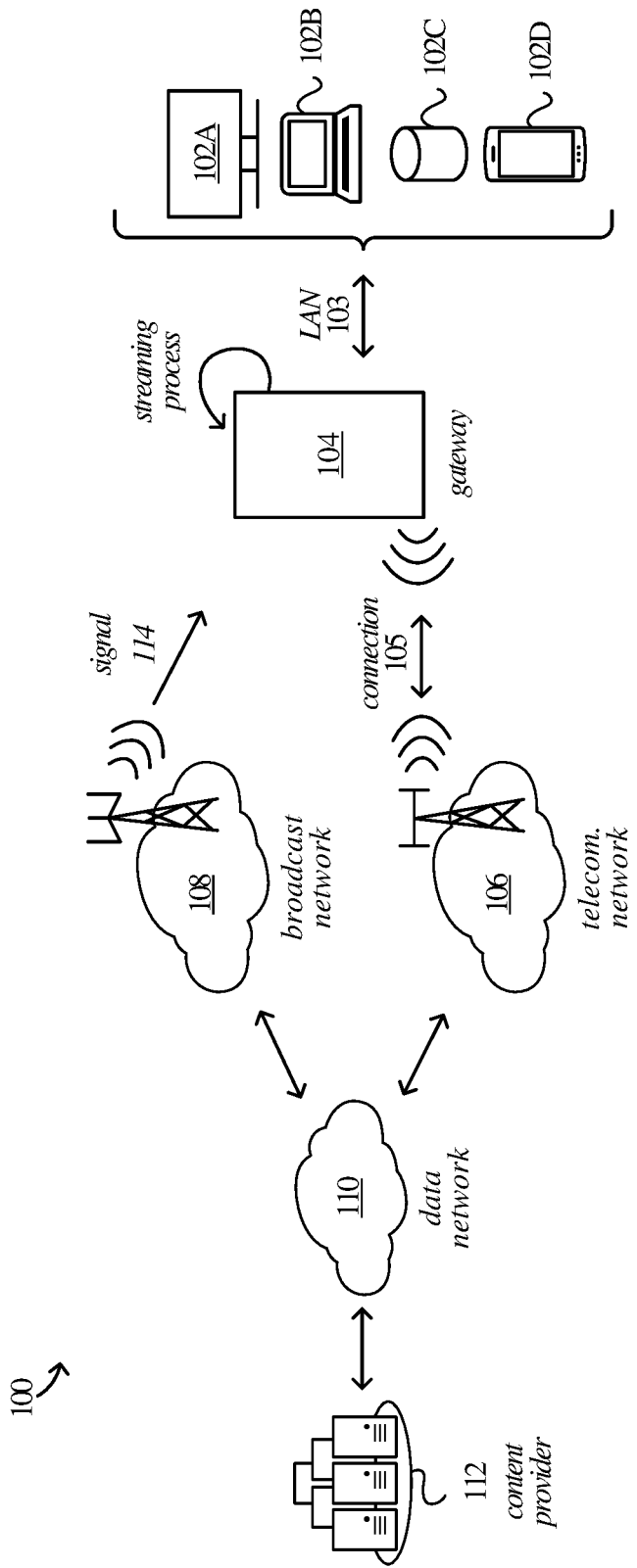
FIG. 1 illustrates an operational environment in an implementation.

Technology disclosed herein is generally directed to improving content streaming over wireless networks and Internet gateway devices in the home, business, and other environments. Implementations employ a streaming process that facilitates a reduction in network congestion by reducing strain on the available bandwidth of a cell of a wireless telecommunications network. Strain on available bandwidth may occur when many viewers in the same geographic area attempt to stream video content at the same time. For example, when thousands of viewers live stream a televised broadcast of their local sports team through cellular-connected gateway devices. The consumption of the live streamed event by so many users strains the capacity of at least a cell of the wireless telecommunications network that serves the gateways and, in turn, the locally connected streaming devices.

In various implementations, a gateway device establishes an Internet connection via a wireless telecommunications network of an Internet service provider (ISP) such as a wireless telecommunication company. The gateway device provides Internet connectivity to one or more devices connected to the gateway device over a local-area network (LAN). The connected devices send and receive Internet traffic over the LAN and Internet connections to and from destinations on the Internet.

The gateway device is capable of transmitting the Internet traffic wirelessly over a radio access network (RAN) of the wireless telecommunications network. Specifically, the gateway device receives Internet traffic from a connected device over the LAN connection. The Internet traffic includes a request for content that is generated, hosted, or otherwise provided by a content provider. The gateway device transmits the Internet traffic to an Internet Protocol (IP) address of the content provider over the wireless telecommunications network of a cellular ISP (e.g., T-Mobile®).

The content provider receives the request and responsively transmits the requested content to an IP address associated with the connected device. The traffic is routed over the Internet to the wireless telecommunications network of the cellular ISP. The cellular ISP then transmits the return traffic wirelessly to the gateway device which, in turn, transmits the traffic over the LAN to the requesting device.

The gateway device is also capable of receiving and decoding a broadcast television signal, referred to herein as a broadcast signal. Broadcast signals include voice components and picture components broadcasted over-the-air in a frequency range of the electromagnetic spectrum. The gateway device may use the Advanced Television Systems Committee (ATSC) 3.0 standard to receive and decode broadcast signals. ATSC 3.0 is a digital television broadcasting standard that provides improved picture quality, higher resolution, and enhanced features such as interactive and personalized services. Other digital television standards are possible such as digital video broadcasting (DVB) (e.g., DVB-terrestrial), ATSC 2.0, integrated services digital broadcasting (ISDB) (e.g., ISDB-terrestrial), etc.

Various technical effects apparent from the technology disclosed herein include a preservation of cellular bandwidth accomplished by obtaining digital content from a broadcast television signal, rather than streaming the content over a wireless Internet connection. Such an advance frees up wireless spectrum for other uses such as email, web browsing, or even the streaming of other content. Such benefits are especially apparent when multiple streams of the same content are transmitted to multiple end-users at approximately the same time. Moving some or all of the end-users to a local stream generated from a digital broadcast television signal reduces or removes some or all of the streams that otherwise would be transmitted nearly simultaneously to the end-users.

Figure 14:
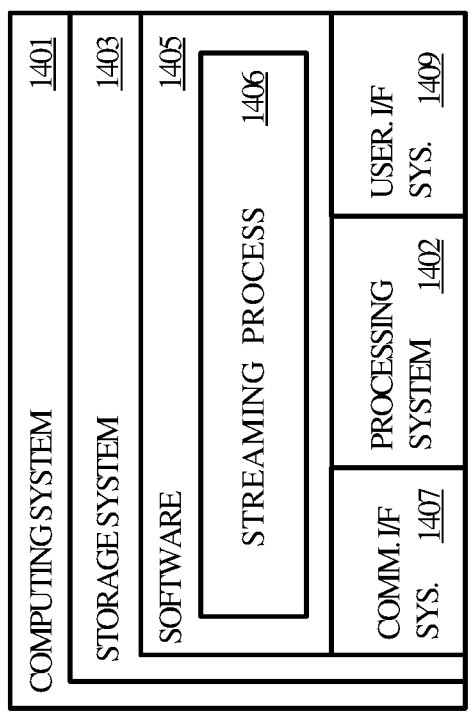
FIG. 14 illustrates a computing system suitable for implementing the various operational environments, architectures, processes, scenarios, and sequences discussed below with respect to the other Figures.

Referring to the Figures, FIG. 1 illustrates operational environment 100 in an implementation. Operational environment 100 includes streaming devices 102A-D, connection 103, gateway device 104, Internet connection 105, telecommunications network 106, broadcast network 108, data network 110, content provider 112, and broadcast signal 114. Streaming devices 102A-D are each representative of a computing device suitable for streaming content. Streaming devices 102A-D interface with gateway device 104 over a LAN connection (e.g., connection 103) to transmit requests for streamed content and receive the requested streamed content. Streaming devices 102A-D cause the requested streamed content to be displayed in a user interface. Examples of streaming devices 102A-D include Internet-enabled televisions, mobile phones, tablet computers, laptop computers, desktop computers, smart speakers, streaming dongles, and the like, of which computing device 1401 in FIG. 14 is representative.

Connection 103 is representative of a LAN connection between gateway device 104 and streaming devices 102A-D. LANs include a collection of computing devices that are connected together (e.g., via a gateway device) in one physical location, such as a home, building, or office. Connection 103 may be a wired LAN connection that employs TCP/IP Ethernet cabling and the like to connect streaming devices 102A-D to gateway device 104. Connection 103 may be a wireless LAN connection that employs Wi-Fi technology and the like to connect streaming devices 102A-D to gateway device 104.

Gateway device 104 is a telecommunications network node that establishes an Internet connection (e.g., connection 105) between streaming devices 102A-D and content provider 112. Gateway device 104 includes an interface for receiving and sending Internet traffic over telecommunications network 106. Gateway device 104 uses protocols that allow bidirectional Internet traffic to pass between streaming devices 102A-D and content provider 112. For example, gateway device 104 uses protocols to encapsulate and decapsulate data packets of the bidirectional Internet traffic.

Gateway device 104 further includes an interface capable of receiving unidirectional broadcast signals (e.g., broadcast signal 114) that are broadcasted over-the-air by broadcast network 108. Gateway device 104 uses protocols that allow digital content of the broadcast signals to pass to streaming devices 102A-D. For example, gateway device 104 uses protocols to decode the digital content of a broadcast signal and to encapsulate the digital content for transmission to streaming devices 102A-D over connection 103. Gateway device 104 may perform additional functions such as routing, network address translation, firewalling, and quality of service management to ensure that the transmitted data is secure and reaches its destination in a timely and reliable manner. Computing device 1401 in FIG. 14 is representative of gateway device 104.

Connection 105 is representative of bidirectional Internet connection between gateway device 104 and telecommunications network 106. Connection 105 supports the bidirectional flow of Internet traffic between connected devices 102A-D and content provider 112. Internet traffic is the flow of data within a network link of the Internet. Examples of Internet traffic include packets of data for audio and video streams, website access, content downloading, social media posts, online gaming, file transfers, voice and video calls, email communications, etc. Examples of connection 105 include wireless communication signals.

Telecommunications network 106 is representative of a wireless telecommunications network of an ISP (e.g., T-Mobile®). Telecommunications network 106 includes telecommunication networking technologies (e.g., antenna towers, transmission towers, switches, edge servers, etc.) distributed over long distances and between different networks. Telecommunications network 106 includes a radio access network that connects individual devices (e.g., cellular phones, tablets, gateway devices, etc.) to the core ISP network and provides radio coverage to multiple devices of a geographic area. Telecommunications network 106 may include Fifth Generation New Radio (5G NR) network technology, which leverages technologies like millimeter-wave spectrum, massive MIMO, and network slicing to meet the demands of diverse use cases.

Broadcast network 108 is representative of a content distribution source that uses frequencies of the electromagnetic spectrum to broadcast a digital feed of unidirectional, broadcast television signals over the airwaves. The digital feed includes digital content and may adhere to standards set by ATSC (e.g., ATSC 3.0), DVB (e.g., DVB-terrestrial), ISDB (e.g., ISDB-terrestrial), and the like. Broadcast network 108 uses a high-power, Earth-based transmission tower to transmit broadcast signal 114 over the air.

Data network 110 is representative of a communication network or networks that transmit Internet traffic in accordance with various communication protocols, combinations of protocols, or variations thereof. Data network 110 supports an Internet connection between streaming devices 102A-D and content provider 112. Data network 110 may include leased lines, satellite links, private and public communication links, routers, switches, edge servers, transmission towers, and the like. Examples of data network 110 include intranets, internets, the Internet, local area networks, wide area networks, wireless networks, wired networks, virtual networks, software defined networks, data center buses and backplanes, or any other type of network, combination of network, or variation thereof.

Content provider 112 represents a service that provides digital content for consumption by one or more end-users. Digital content includes audio data (e.g., voice components) and video data (e.g., picture components). Examples of content provider 112 include Prime Video®, Peacock®, YouTube®, Apple TV+®, etc. Content provider 112 employs one or more server computers connected to or otherwise in communication with data network 110, broadcast network 108, telecommunications network 106, and gateway device 104. Examples of such servers include web servers, application servers, virtual or physical servers, or any combination or variation thereof.

Broadcast signal 114 is representative of a unidirectional, broadcast television signal that includes digital content (e.g., audio data, video data, etc.) received by broadcast network 108 from content provider 112 directly (e.g., via satellite uplink, etc.) or indirectly (e.g., via data network 110). Broadcast signal 114 includes a frequency of the electromagnetic spectrum. Broadcast signal 114 may be an ATSC signal (i.e., conforms to ATSC standards).

Figure 2:
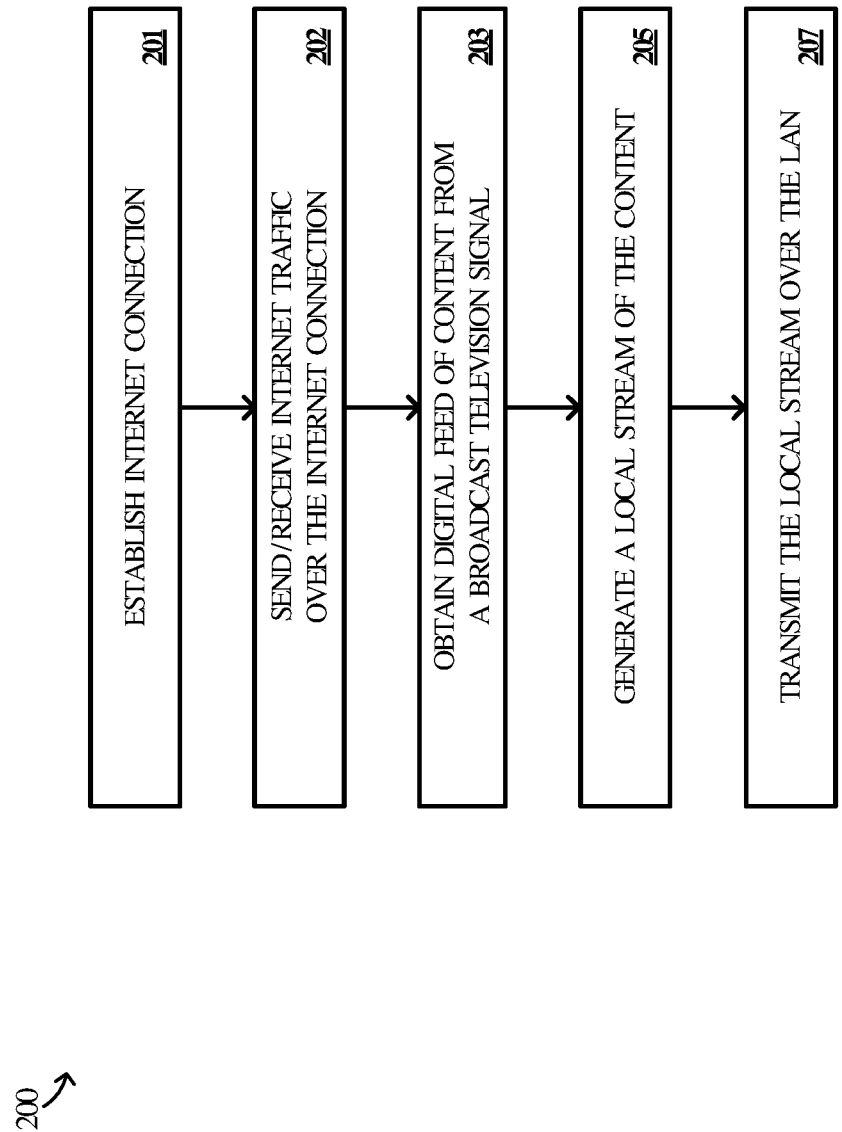
FIG. 2 illustrates a streaming process in an implementation.
Figure 3:
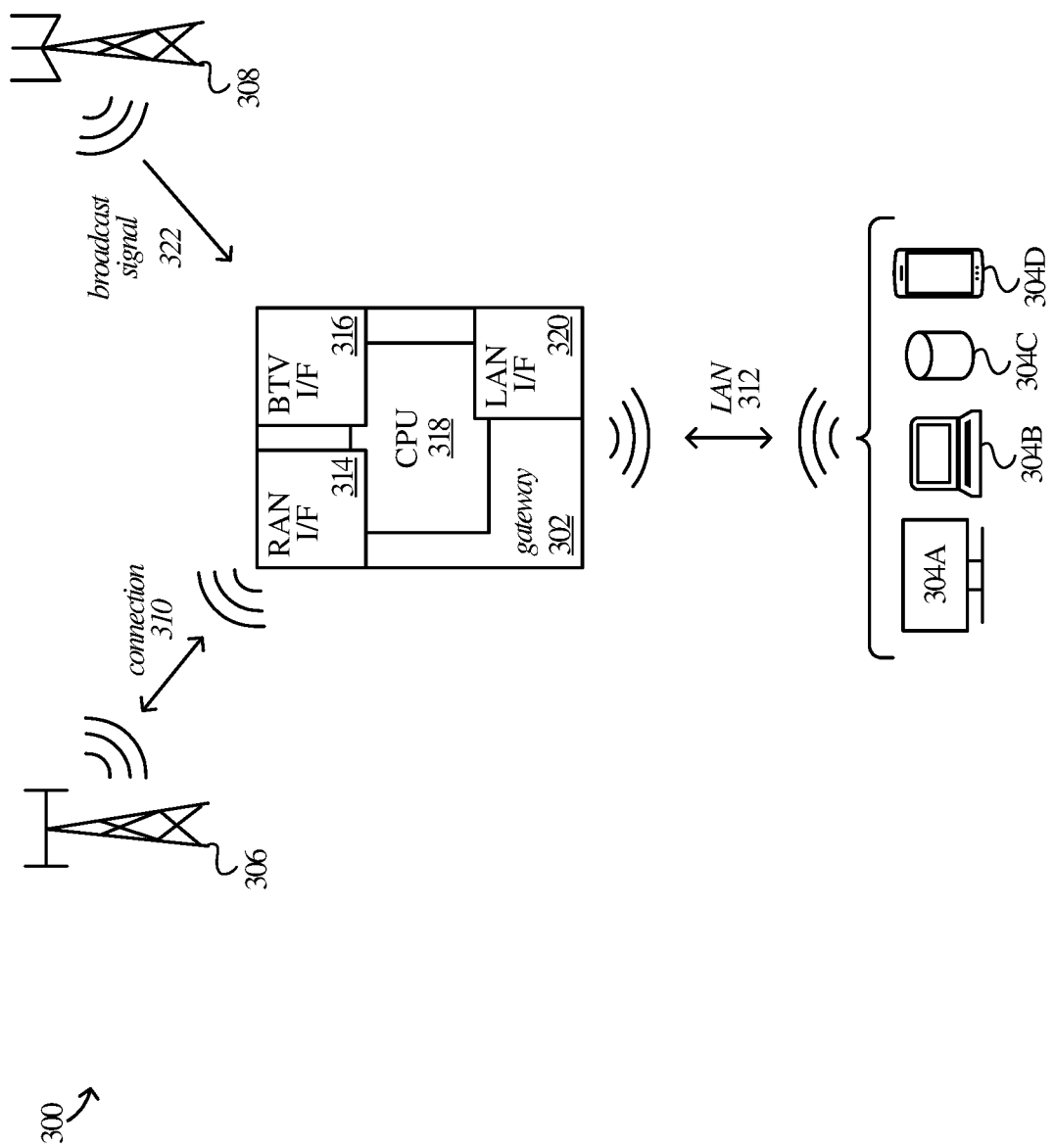
FIG. 3 an operational architecture in an implementation.

FIG. 2 illustrates streaming process 200, and FIG. 3 illustrates operational architecture 300 in an implementation of a gateway device providing the improved content streaming capabilities disclosed herein. Streaming process 200 may be implemented in program instructions in the context of any of the software applications, modules, components, or other such elements of one or more computing devices (e.g., gateway device 302, streaming devices 304A-D, etc.) disclosed herein. The program instructions, when executed by one or more processors of a gateway device, direct the gateway device to operate as follows. The steps of streaming process 200 are discussed parenthetically in the context of the discussion of FIG. 3.

Operational architecture 300 includes gateway device 302, streaming devices 304A-D, telecommunications tower 306, and broadcast network tower 308. Gateway device 302 represents an example of gateway devices 104 and 406, though gateway devices 104 and 406 may differ. Gateway device 302 is a telecommunications network node that establishes an Internet connection (e.g., connection 310) between streaming devices 304A-D and telecommunications tower 306. Streaming devices 304A-D are each representative of a computing device suitable for streaming content. Gateway device 302 also establishes a wireless LAN connection (e.g., connection 312) with streaming devices 304A-D. Computing device 1401 in FIG. 14 is representative of gateway device 302.

Gateway device 302 includes RAN interface 314, broadcast television interface 316, central processing unit (CPU) 318, and LAN interface 320. RAN interface 314 is a network port or connection used by gateway device 302 to serve as a bridge between a local network (e.g., via LAN interface 320) and the wider network (e.g., telecommunications tower 306), enabling bidirectional communication between the two. RAN interface 314 may include a digital interface device (e.g., channel service unit, data service unit, etc.), RAN interface card, an application programming interface (e.g., for translating and encapsulating network protocols, etc.), and the like. RAN interface 314 may employ 5G, 4G LTE, and similar technologies to establish connection 310.

Employing RAN interface 314, gateway device 302 establishes Internet connection 305 (step 201) between telecommunications tower 306 and streaming devices 304A-D. Telecommunications tower 306 is a RAN transmission tower of an ISP network (e.g., telecommunications network 106) that supports the transmission of Internet traffic. Internet traffic includes a request from streaming devices 304A-D for a remote stream of data (e.g., digital content) generated, hosted, transmitted, or otherwise provided by a content provider (not shown), and a stream of the requested content transmitted by the content provider. Gateway device 302, via RAN interface 314, sends and receives Internet traffic over connection 305 (step 202).

Employing broadcast television interface 316, gateway device 302 obtains the digital content (e.g., audio data, video data, etc.) of broadcast signal 322 (step 203). Gateway device 302, via broadcast television interface 316, obtains the digital content by tuning to broadcast signal 322, extracting the digital content from broadcast signal 322, and decoding the digital content from a broadcast television protocol (e.g., ATSC 3.0, etc.) of broadcast signal 322. Broadcast signal 322 is representative of a unidirectional, broadcast television signal that is transmitted by broadcast network tower 308 at a frequency of the electromagnetic spectrum. Broadcast network tower 308 is an Earth-based broadcast tower that broadcasts unidirectional television signals. Broadcast television interface 316 includes a receiver and a tuner (e.g., an ATSC 3.0 tuner, etc.) that discovers, identifies, or otherwise tunes to broadcast signal 322.

Gateway device 302 may obtain the digital content responsive to congestion on a RAN, a wide area network, and the like. For example, when Internet traffic is equal to or exceeds a threshold level of congestion, the gateway device may automatically obtain the digital content of broadcast signal 322. The threshold level of congestion is a defined limit or point of reference that indicates when a communication network has become congested or overwhelmed with traffic. Specifically, the threshold level of congestion is a measure of the level of utilization or occupancy of a resource (e.g., bandwidth) beyond which performance degradation or quality of service may be affected. The threshold level of congestion may be defined in terms of packet loss, delay, jitter, time (e.g., millisecond), queue-limit (e.g., a maximum number of packets or bytes a queue may hold), and the like. Responsive to the congestion meeting or exceeding the threshold level of congestion, gateway device 302 may automatically instruct streaming devices 304A-D to cease the content streamed from the content provider to streaming devices 304A-D and switch to obtaining the digital content from broadcast signal 322. Alternatively, responsive to the congestion meeting or exceeding the threshold level of congestion, gateway device 302 may automatically generate and transmit a prompt that requests permission to switch from receiving the streamed content to obtaining the digital content from broadcast signal 322.

Gateway device 302 may also obtain the digital content responsive to detecting or otherwise becoming aware of broadcast signal 322. For example, gateway device 302 may employ an application programming interface to detect, identify, or otherwise become aware of broadcast signal 322. Responsive to detecting broadcast signal 322, gateway device 302 may automatically switch from receiving the stream of the requested content transmitted by the content provider to obtaining the digital content from broadcast signal 322. Alternatively, responsive to detecting broadcast signal 322, gateway device 302 may automatically generate and transmit a prompt that requests permission to switch from receiving the streamed content to obtaining the digital content from broadcast signal 322.

Alternatively, gateway device 302 may obtain the digital content responsive to a request for the content being redirected to a server hosted on gateway device 302 (not shown). For example, responsive to streaming devices 304A-D sending a request for content to the content provider (e.g., via connections 310 and 312), the content provider may redirect streaming devices 304A-D to send the request to a server hosted on gateway device 302. The content provider may redirect streaming device 304A-D using redirection techniques that are implemented in the network infrastructure of the content provider. The content provider may redirect streaming devices 304A-D responsive to determining that the requested content is available via an over-the-air broadcast source (e.g., broadcast signal 322). The redirection request of the content provider may include an identification of broadcast signal 322 to which gateway device 302 (e.g., via broadcast television interface 316) may tune in order to obtain the digital content.

Employing CPU 318, gateway device 302 retrieves software from memory and executes the software to direct the operations of gateway device 302 including the operations of RAN interface 314, broadcast television interface 316, and LAN interface 320. Gateway device 302, via CPU 318, generates a local stream of the digital content (step 205) that was obtained from broadcast signal 322. The local stream of the digital content may be generated by gateway device 302, via CPU 318, retrieving the decoded digital content from broadcast television interface 316 and encapsulating the decoded content in a network protocol (e.g., IP, Wi-Fi, etc.). CPU 318 may include memory for recording and storing the digital content of broadcast signal 322 as well as memory for recording and storing the local stream of media.

Employing LAN interface 320, gateway device 302 then transmits the local stream of digital content to streaming devices 304A-D (step 207). Gateway device 302 also employs LAN interface 320 to send and receive Internet traffic including content streamed by content providers. LAN interface 320 may include a digital interface device (e.g., channel service unit, data service unit, etc.), network interface card, an application programming interface (e.g., for translating and encapsulating network protocols) and the like.

Figure 4:
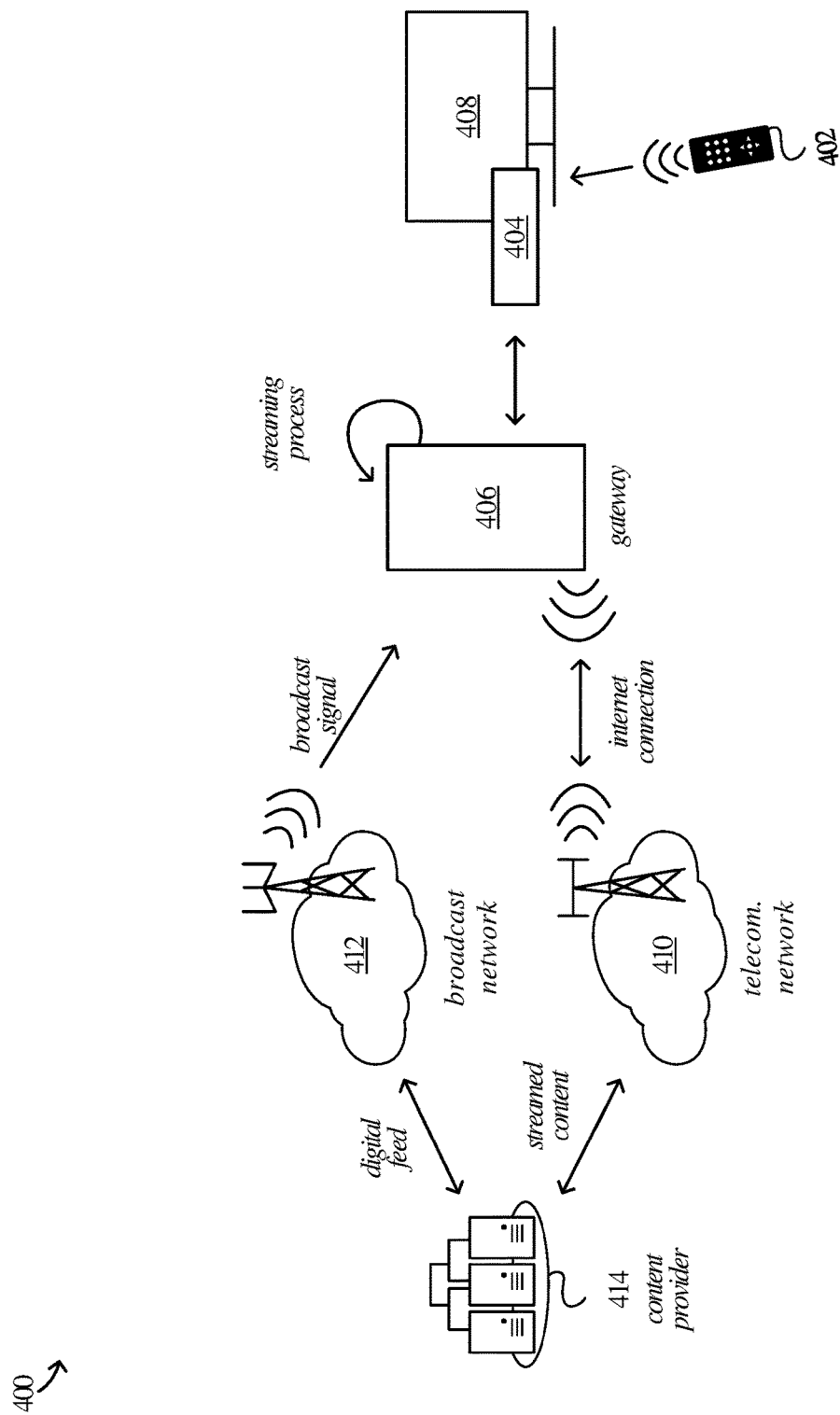
FIG. 4 illustrates an operational environment in an implementation.

FIG. 4 illustrates operational environment 400 in an implementation in which a user employs remote-control 402 and streaming device 404 to obtain digital content via gateway device 406. Operational environment 400 includes remote-control 402, streaming device 404, gateway device 406, television 408, telecommunications network 410, broadcast network 412, and content provider 414. Remote-control 402 is representative of any device capable of controlling streaming device 404 from a distance. Examples of remote-control 402 include—but are not limited to—mobile telephones, gesture control systems and devices, universal remotes, voice-controlled remotes, and the like.

Streaming device 404 is representative of software, hardware, or both software and hardware that interfaces between television 408 and gateway device 406. Computing device 1401 in FIG. 14 is representative of streaming device 404. Examples of streaming device 404 include internet dongles (e.g., Wi-Fi dongle, Internet stick, USB modem, network adaptor, USB mobile broadband stick, etc.), streaming interfaces (e.g., of Internet-enabled television sets, etc.), and the like. Though streaming device 404 is depicted as being external to television 408, it is contemplated herein that streaming device 404 may be an internal component (e.g., a streaming interface) of television 408. Though streaming device 404 is depicted as being external to gateway device 406, it is contemplated herein that streaming device 404 may be an internal component (e.g., a streaming interface) of gateway device 406.

Television 408 is representative of a device having a user interface through which digital content may be consumed, prompts from streaming device 404 may be displayed, prompts from a server of gateway device 406 may be displayed, selections of prompt elements may be made, and the like. Though television 408 is depicted as being separate from streaming device 404, it is contemplated herein that streaming device 404 may be an internal component (e.g., a streaming interface) of television 408.

Gateway device 406 is a communication network node that provides a wireless LAN connection with streaming device 404 and establishes an Internet connection with telecommunications network 410. Gateway device 406 includes a broadcast television interface capable of receiving broadcast television signals transmitted by broadcast network 412, a RAN interface for receiving and sending Internet traffic via telecommunications network 410, and a LAN interface for receiving and sending Internet traffic to connected devices over a LAN connection. Computing device 1401 in FIG. 14 is representative of gateway device 406. Though gateway device 406 is depicted as being separate from streaming device 404, it is contemplated herein that streaming device 404 may be an internal component (e.g., a streaming interface) of gateway device 406.

Telecommunications network 410 is representative of a wireless telecommunications network of an ISP. Telecommunications network 410 includes telecommunication networking technologies (e.g., antenna towers, transmission towers, switches, edge servers, etc.) distributed over long distances and between different networks. Telecommunications network 410 includes a radio access network that connects individual devices (e.g., cellular phones, tablets, gateway devices, etc.) to the core ISP network and provides radio coverage to multiple devices of a geographic area. Telecommunications network 410 may include 5G NR network technology. In an implementation, telecommunications network 410 uses cells of a transmission tower to transmit streamed content at frequencies greater than 850 MHz.

Broadcast network 412 is representative of a content distribution source that uses the electromagnetic spectrum to broadcast digital content of unidirectional, radio signals over the airwaves. The digital content may adhere to standards set by the ATSC (e.g., ATSC 3.0), DVB (e.g., DVB-terrestrial), ISDB (e.g., ISDB-terrestrial), and the like. In an implementation, broadcast network 412 uses a high-power transmission tower to transmit over-the-air broadcast signals at frequencies less than 850 MHz.

Content provider 414 represents a service that provides digital content for consumption by one or more end-users. Digital content includes audio data (e.g., voice components) and video data (e.g., picture components). Examples of content provider 414 include Prime Video®, Peacock®, YouTube®, Apple TV+®, etc. Content provider 414 employs one or more server computers connected to or otherwise in communication with broadcast network 412, telecommunications network 410, and gateway device 406. Examples of such servers include web servers, application servers, virtual or physical servers, or any combination or variation thereof.

In an implementation, streaming device 404 receives selection inputs transmitted by remote-control 402 in accordance with known techniques. Selection inputs include clicks, voice commands, gestures, and the like. Responsive to a selection input, streaming device 404 transmits a connection request to gateway device 406 to establish an Internet connection with content provider 414. The connection request may include a request for streamed content. Responsive to the connection request, gateway device 406 establishes an Internet connection with content provider 414 over telecommunications network 410.

Responsive to a request for digital content sent by streaming device 404, gateway device 406 obtains streamed content from content provider 414 and transmits the streamed content to streaming device 404 for display on television 408. Employing a streaming process, gateway device 406 identifies a broadcast television signal broadcasted by broadcast network 412. The broadcast television signal includes an over-the-air version of the digital content. Responsive or subsequent to identifying the broadcast television signal, gateway device 406 obtains the digital content from the broadcast television signal.

Next, gateway device 406 generates a local stream of the requested content based on the digital content and transmits the local stream to streaming device 404 over the LAN connection. Streaming device 404 then sends the local stream to television 408 for display. Alternatively, gateway device 406 may store the local stream to memory. The storing event may occur prior to, at relatively the same time as, or after transmitting the local stream to streaming device 404.

Figure 5:
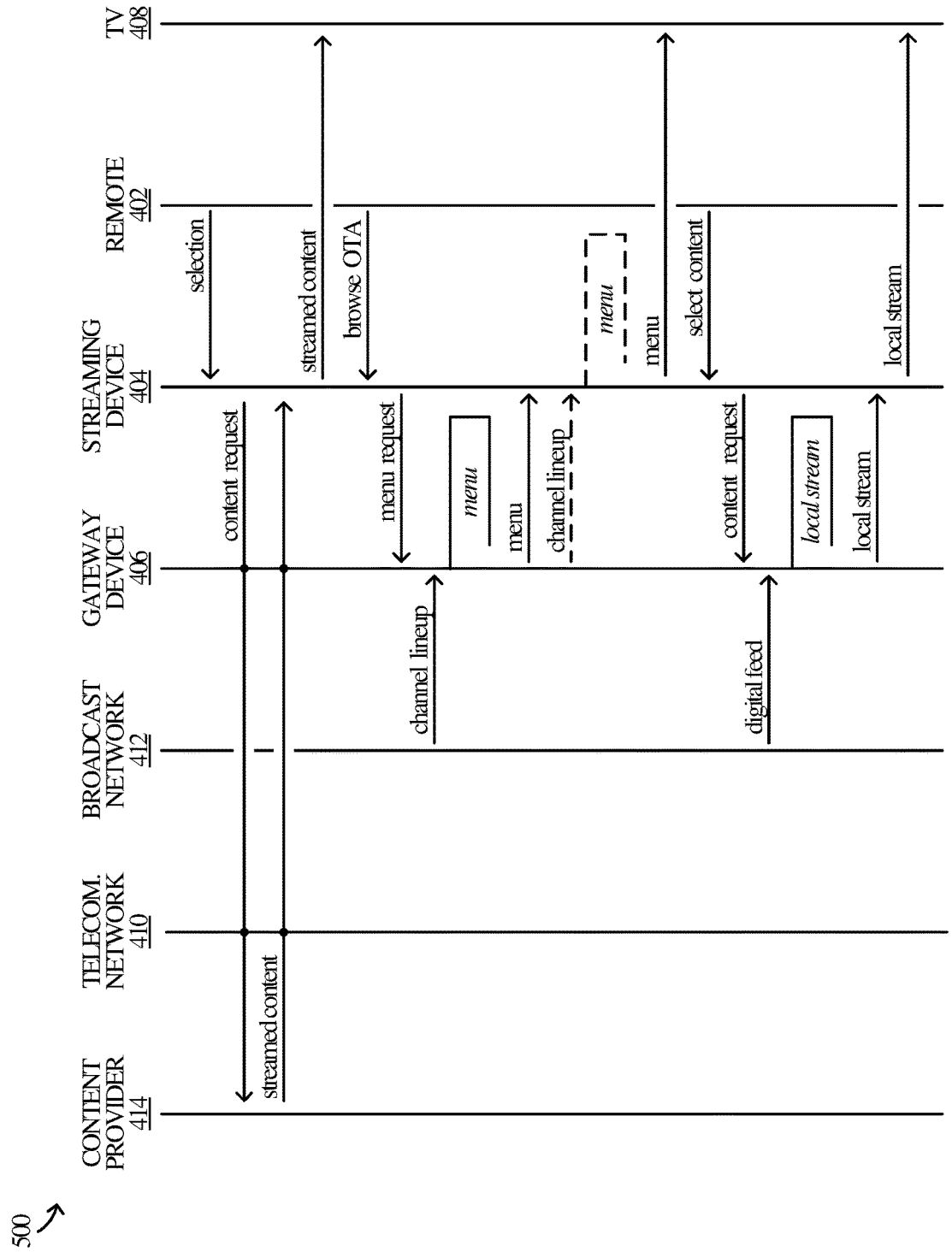
FIG. 5 illustrates an operational scenario in an implementation.

FIG. 5 illustrates a brief operational scenario 500 in an implementation in which gateway device 406 switches from transmitting streamed content to transmitting a local stream of content. Specifically, a viewer uses remote-control 402 to select a user interface element for viewing digital content. Subsequent to receiving the user's selection, streaming device 404 transmits a request for the digital content to content provider 414. Subsequent to receiving the request for content, content provider 414 transmits streamed content to streaming device 404. Streaming device 404 then transmits the streamed content to television 408 for display in a user interface of television 408.

Next, the viewer uses remote-control 402 to select a user interface element for browsing available over-the-air content (e.g., content broadcasted by broadcast network 412). Subsequent to receiving the user's selection, streaming device 404 transmits to gateway device 406 a request for a menu of available over-the-air content. Gateway device 406 then obtains a channel lineup from the digital content of a broadcast television signal transmitted by broadcast network 412. Subsequent to obtaining the digital content, gateway device 406 generates (e.g., via a server of the gateway) a menu that includes the channel lineup and transmits to streaming device 404 the menu. Alternatively, gateway device 406 transmits the channel lineup to streaming devices 404, and streaming devices 404 generate the menu that includes the channel lineup. Streaming device 404 then transmits the menu to television 408 for display in a user interface of television 408. The menu may include just the available over-the-air content or an integrated selection of available streaming content as well as the available over-the-air content.

Then, the viewer uses remote-control 402 to select a user interface element for viewing the over-the-air content listed in the displayed menu. Subsequent to receiving the user's selection, streaming device 404 transmits to gateway device 406 a request for the over-the-air content. Gateway device 406 obtains the over-the-air content from a digital feed of a broadcast television signal transmitted by broadcast network 412. Gateway device 406 then generates a local stream of the over-the-air content and transmits the local stream to streaming device 404. Finally, streaming device 404 sends the local stream to television 408 for display.

Figure 6:
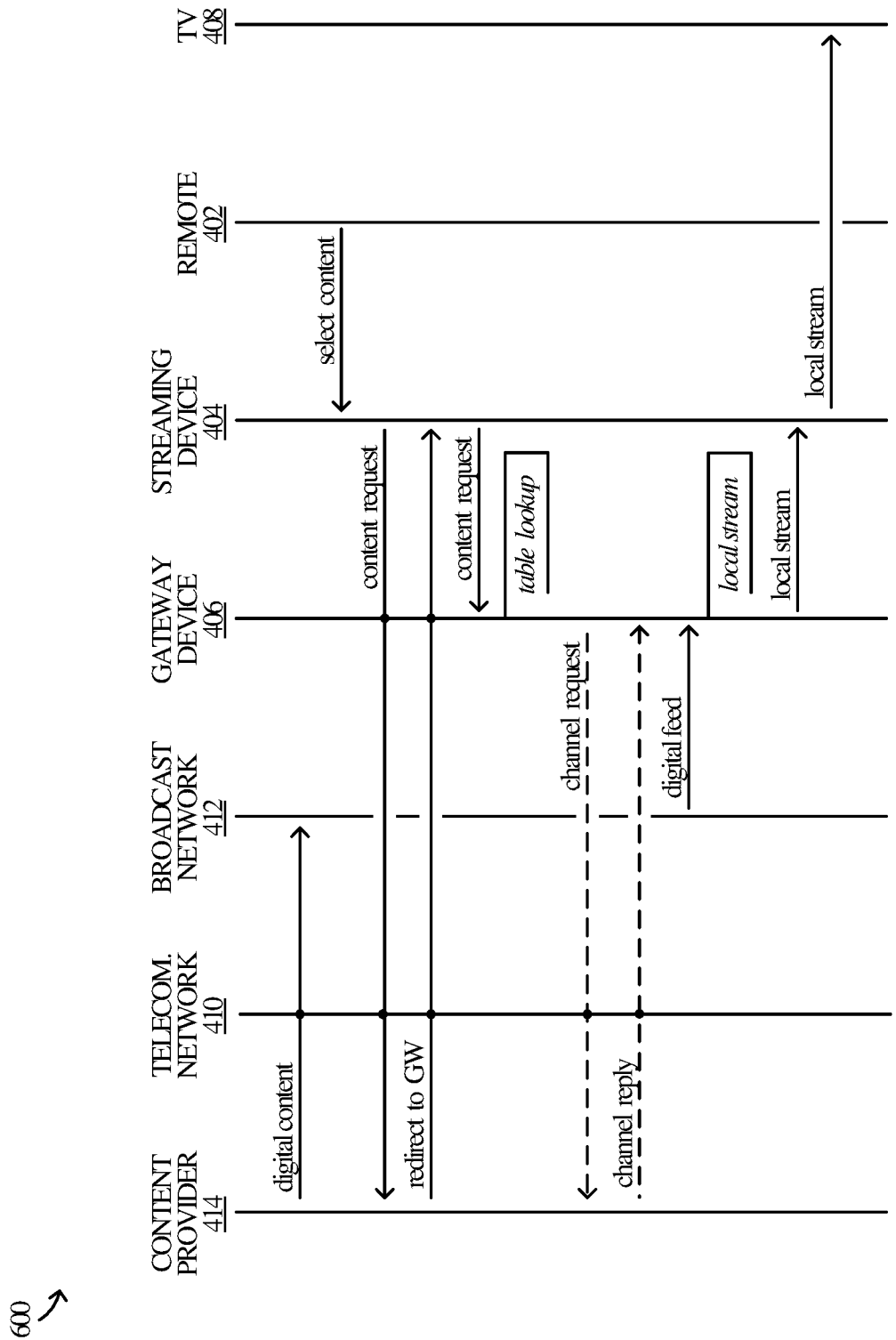
FIG. 6 illustrates an operational scenario in an implementation.

FIG. 6 illustrates a brief operational scenario 600 in an implementation in which content provider 414 redirects streaming device 404 to send a request for content to gateway device 406. Specifically, content provider 414 transmits digital content to broadcast network 412 via telecommunications network 410. Though, content provider 414 is depicted as transmitting the digital content to broadcast network 412, it is also contemplated herein that a different content provider transmits the digital content to broadcast network 412.

Next, a viewer uses remote-control 402 to select a user interface element for viewing the digital content. Subsequent to receiving the user's selection, streaming device 404 transmits a request for the digital content to content provider 414. Subsequent to receiving the request for content, content provider 414 redirects the content request to streaming device 404. The redirected request may include an instruction to send a request for the digital content to a server hosted on gateway device 406. The redirected request may also include an identity of the digital content examples of which include a radio frequency identifier, a broadcast channel identifier, a name or similar identifier of the content, a name or similar identifier of the content provider that transmits the content, and the like.

Responsive to receiving the redirection instruction from content provider 414, streaming device 404 sends a request to gateway device 406 to obtain digital content from an over-the-air source (e.g., a broadcast television signal). Streaming device 404 may direct the request to an IP address of gateway device 406 (e.g., an IP address of a server hosted by gateway device 406). Responsive to the request, gateway device 406 identifies the broadcast television signal based on an identity of the content. To identify the broadcast television signal, gateway device 406 may access a database, a spreadsheet, a table, or similar repository. Alternatively, gateway device 406 may transmit to content provider 414 a channel request for the identification of the over-the-air source of the digital content. Responsive to the channel request, content provider 414 may transmit a response including an identification of the broadcast television signal.

Then, gateway device 406 obtains a digital feed of the over-the-air content from the identified broadcast television signal broadcasted by broadcast network 412. Gateway device 406 generates a local stream of the over-the-air content and transmits the local stream to streaming device 404. Finally, streaming device 404 sends the local stream to television 408 for display.

Figure 7:
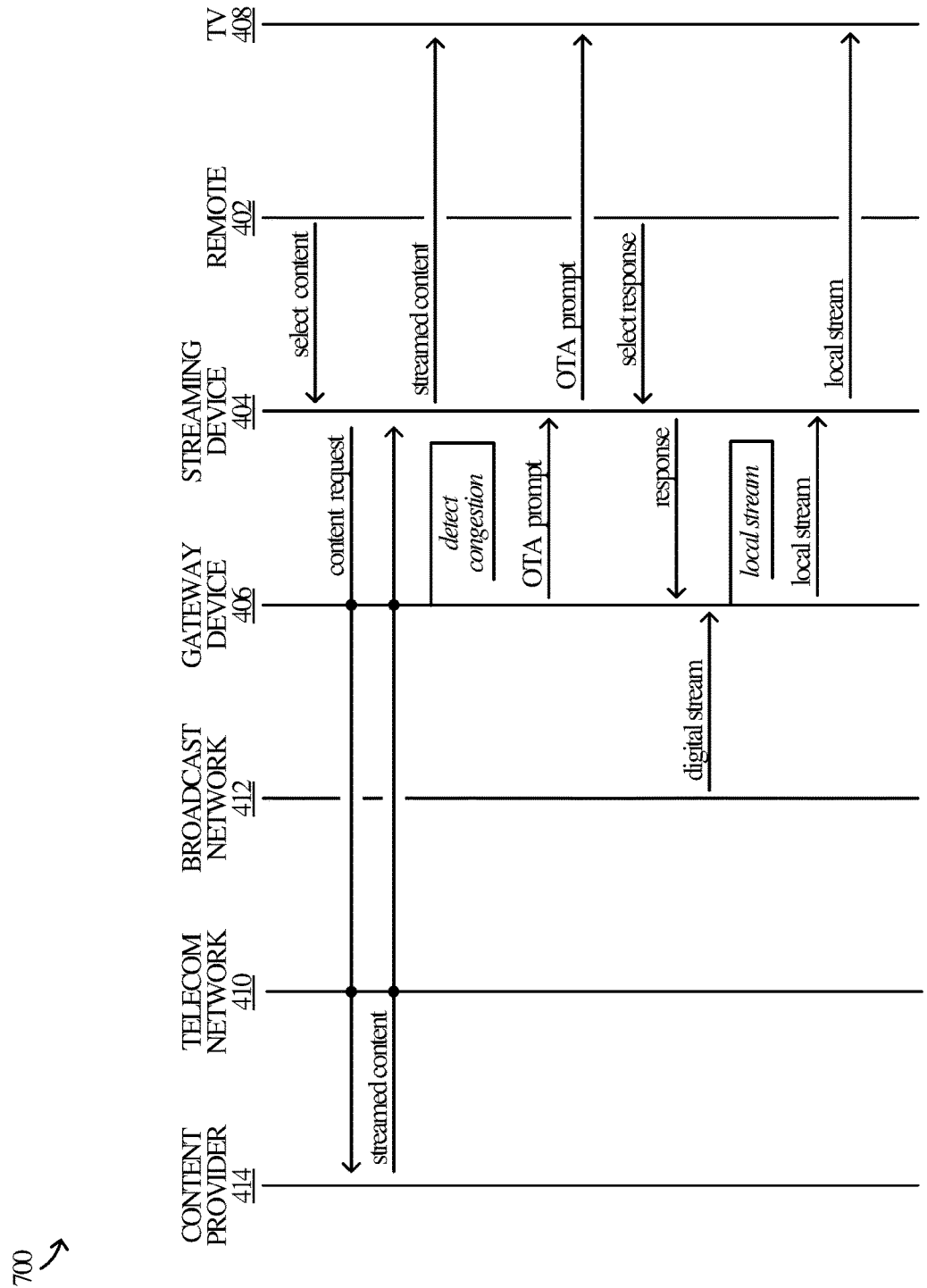
FIG. 7 illustrates an operational scenario in an implementation.

FIG. 7 illustrates a brief operational scenario 700 in an implementation in which gateway device 406 detects a decrease in a quality of service of the Internet connection and prompts a user to switch from a remote source of streamed content to an over-the-air source of the content. Specifically, a viewer uses remote-control 402 to select a user interface element for viewing digital content. Subsequent to receiving the user's selection, streaming device 404 transmits a request for the digital content to content provider 414. Subsequent to receiving the request for content, content provider 414 transmits streamed content to streaming device 404. Streaming device 404 then transmits the streamed content to television 408 for display in a user interface of television 408.

Next, gateway device 406 detects a decrease in a quality of service of the Internet connection (e.g., network congestion, strain, etc.). Responsive to detecting the decrease in the quality of service, gateway device 406 transmits to streaming device 404 a prompt to switch to viewing an over-the-air version of the streamed content. Subsequent to receiving the prompt, streaming device 404 transmits the prompt to television 408 for display. Then, the viewer uses remote-control 402 to select a user interface element for switching to the over-the-air version of the content. Subsequent to receiving the user's selection, streaming device 404 transmits to gateway device 406 a reply that includes the viewer's response to obtain the over-the-air version.

Gateway device 406 then obtains an over-the-air version of the content from a digital feed of a broadcast television signal transmitted by broadcast network 412. Gateway device 406 generates a local stream of the over-the-air version and transmits the local stream to streaming device 404. Finally, streaming device 404 sends the local stream to television 408 for display.

Figure 8:
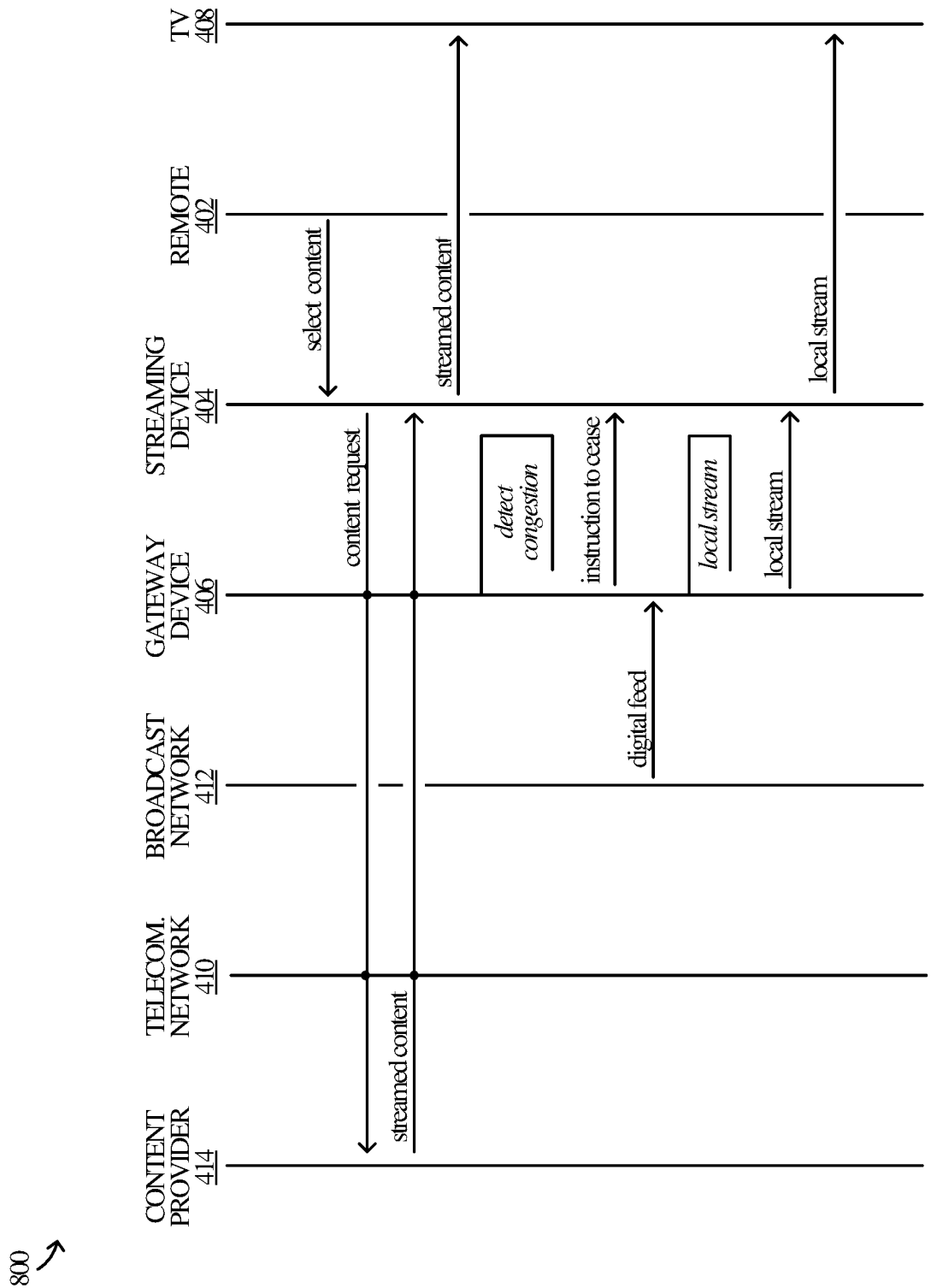
FIG. 8 illustrates an operational scenario in an implementation.

FIG. 8 illustrates a brief operational scenario 800 in an implementation in which gateway device 406 detects a decrease in a quality of service of the Internet connection and automatically switches from a remote source of streamed content to an over-the-air source of the content. Specifically, a viewer uses remote-control 402 to select a user interface element for viewing digital content. Subsequent to receiving the user's selection, streaming device 404 transmits a request for the digital content to content provider 414. Subsequent to receiving the request for content, content provider 414 transmits streamed content to streaming device 404. Streaming device 404 then transmits the streamed content to television 408 for display in a user interface of television 408.

Next, gateway device 406 detects a decrease in a quality of service of the Internet connection (e.g., network congestion, strain, etc.). Responsive to detecting the decrease in the quality of service, gateway device 406 instructs the streaming device to cease the content streamed from the content provider. Then, gateway device 406 obtains an over-the-air version of the content from a digital feed of a broadcast television signal transmitted by broadcast network 412. Gateway device 406 generates a local stream of the over-the-air version and transmits the local stream to streaming device 404. Finally, streaming device 404 sends the local stream to television 408 for display.

Figure 9:
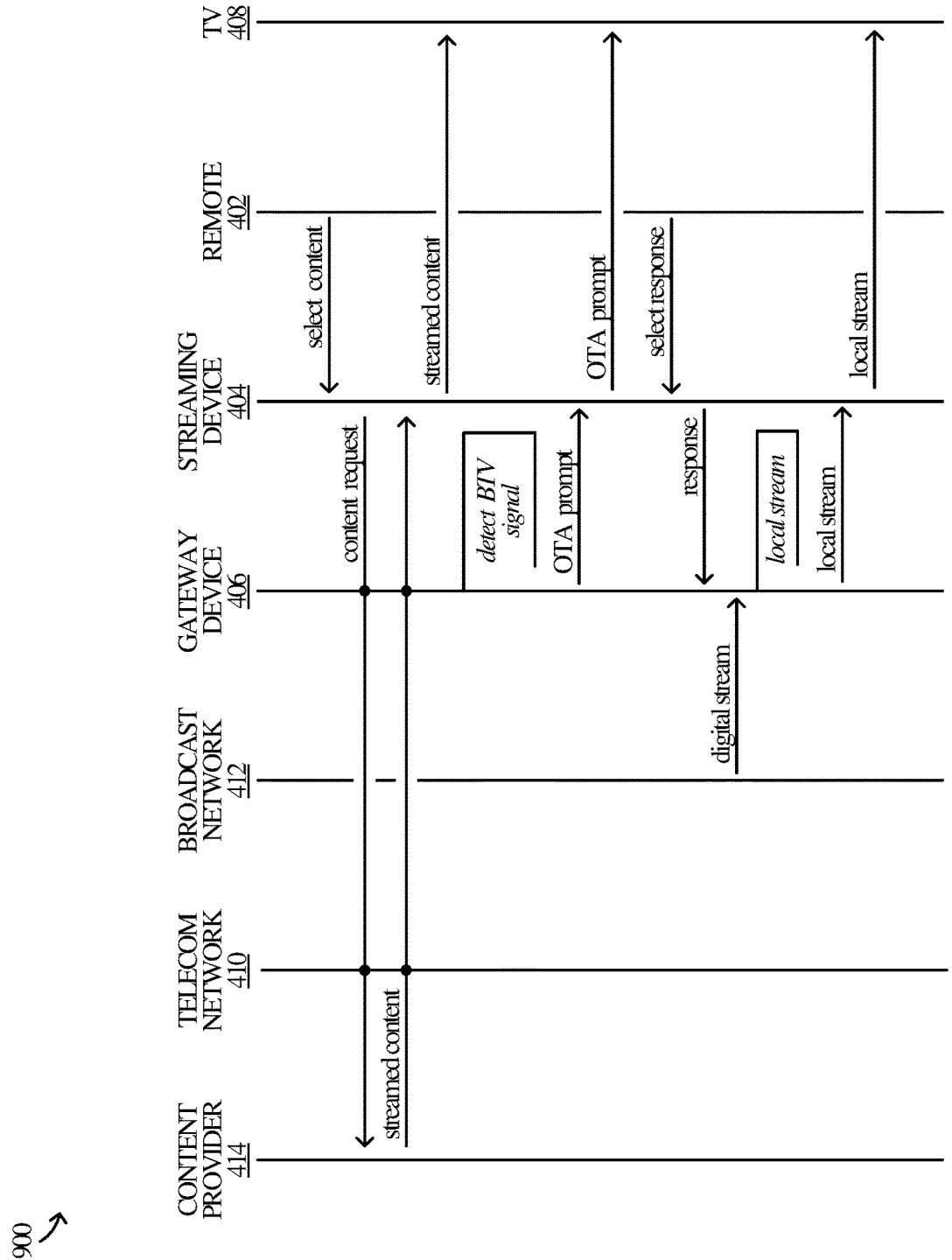
FIG. 9 illustrates an operational scenario in an implementation.

FIG. 9 illustrates a brief operational scenario 900 in an implementation in which gateway device 406 detects an over-the-air source of content in a broadcast television signal and prompts a user to switch from a remote source of streamed content to the over-the-air source of the content. Specifically, a viewer uses remote-control 402 to select a user interface element for viewing digital content. Subsequent to receiving the user's selection, streaming device 404 transmits a request for the digital content to content provider 414. Subsequent to receiving the request for content, content provider 414 transmits streamed content to streaming device 404. Streaming device 404 then transmits the streamed content to television 408 for display in a user interface of television 408.

Next, gateway device 406 detects an over-the-air source of content in a broadcast television signal. Responsive to detecting the over-the-air source of the content, gateway device 406 transmits to streaming device 404 a prompt to switch to viewing an over-the-air version of the streamed content. Subsequent to receiving the prompt, streaming device 404 transmits the prompt to television 408 for display. Then, the viewer uses remote-control 402 to select a user interface element for switching to the over-the-air version of the content. Subsequent to receiving the user's selection, streaming device 404 transmits to gateway device 406 a reply that includes the viewer's response to obtain the over-the-air version.

Gateway device 406 then obtains the over-the-air version of the content from a digital feed of a broadcast television signal transmitted by broadcast network 412. Gateway device 406 generates a local stream of the over-the-air version and transmits the local stream to streaming device 404. Finally, streaming device 404 sends the local stream to television 408 for display.

Figure 10:
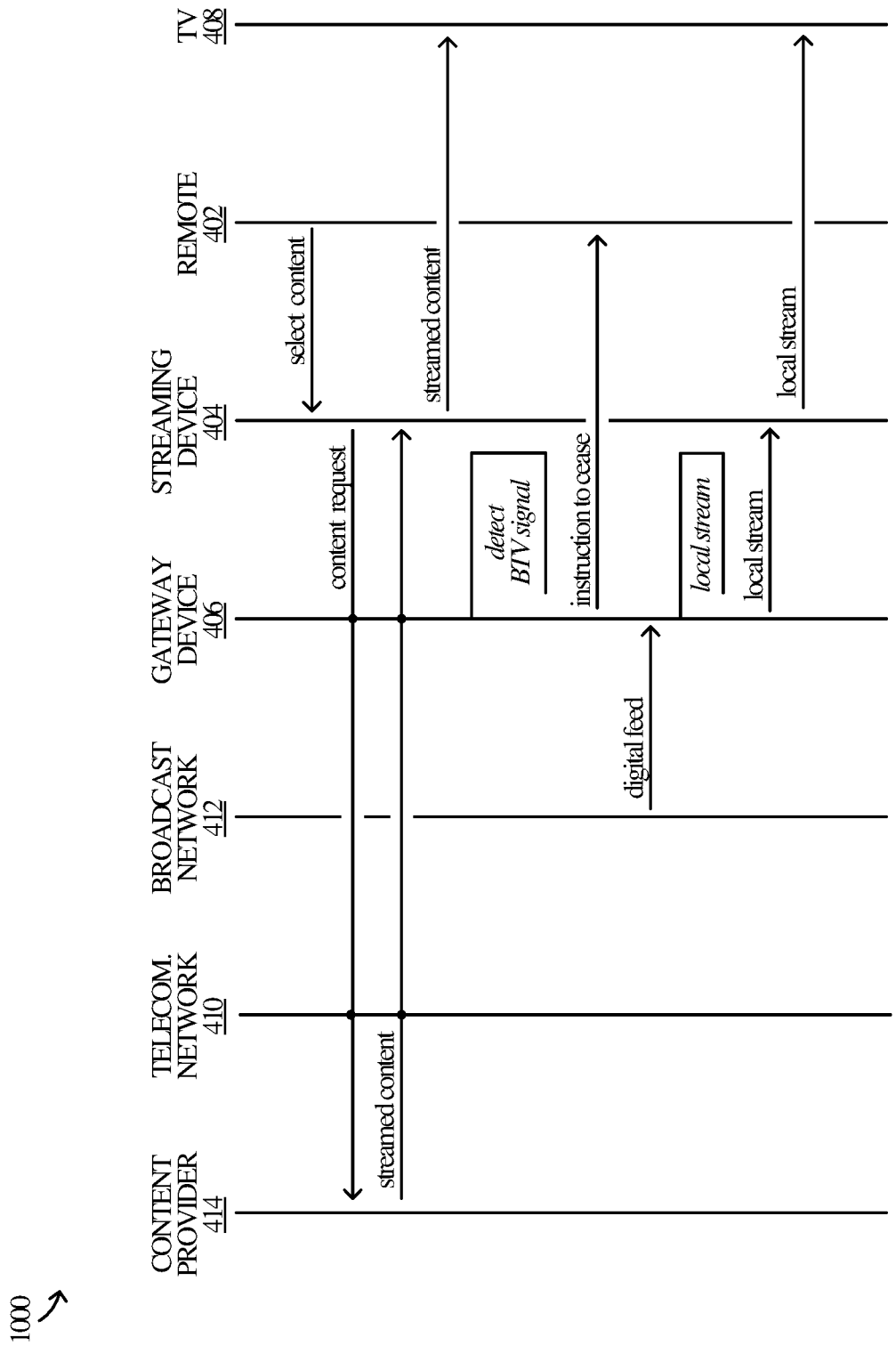
FIG. 10 illustrates an operational scenario in an implementation.

FIG. 10 illustrates a brief operational scenario 1000 in an implementation in which gateway device 406 detects an over-the-air source of content in a broadcast television signal and automatically switches from a remote source of streamed content to the over-the-air source of the content. Specifically, a viewer uses remote-control 402 to select a user interface element for viewing digital content. Subsequent to receiving the user's selection, streaming device 404 transmits a request for the digital content to content provider 414. Subsequent to receiving the request for content, content provider 414 transmits streamed content to streaming device 404. Streaming device 404 then transmits the streamed content to television 408 for display in a user interface of television 408.

Next, gateway device 406 detects an over-the-air source of content in a broadcast television signal. Responsive to detecting the over-the-air source of the content, gateway device 406 instructs the streaming device to cease the content streamed from the content provider. Then, gateway device 406 obtains an over-the-air version of the content from a digital feed of the broadcast television signal transmitted by broadcast network 412. Gateway device 406 generates a local stream of the over-the-air version and transmits the local stream to streaming device 404. Finally, streaming device 404 sends the local stream to television 408 for display.

Figure 11:
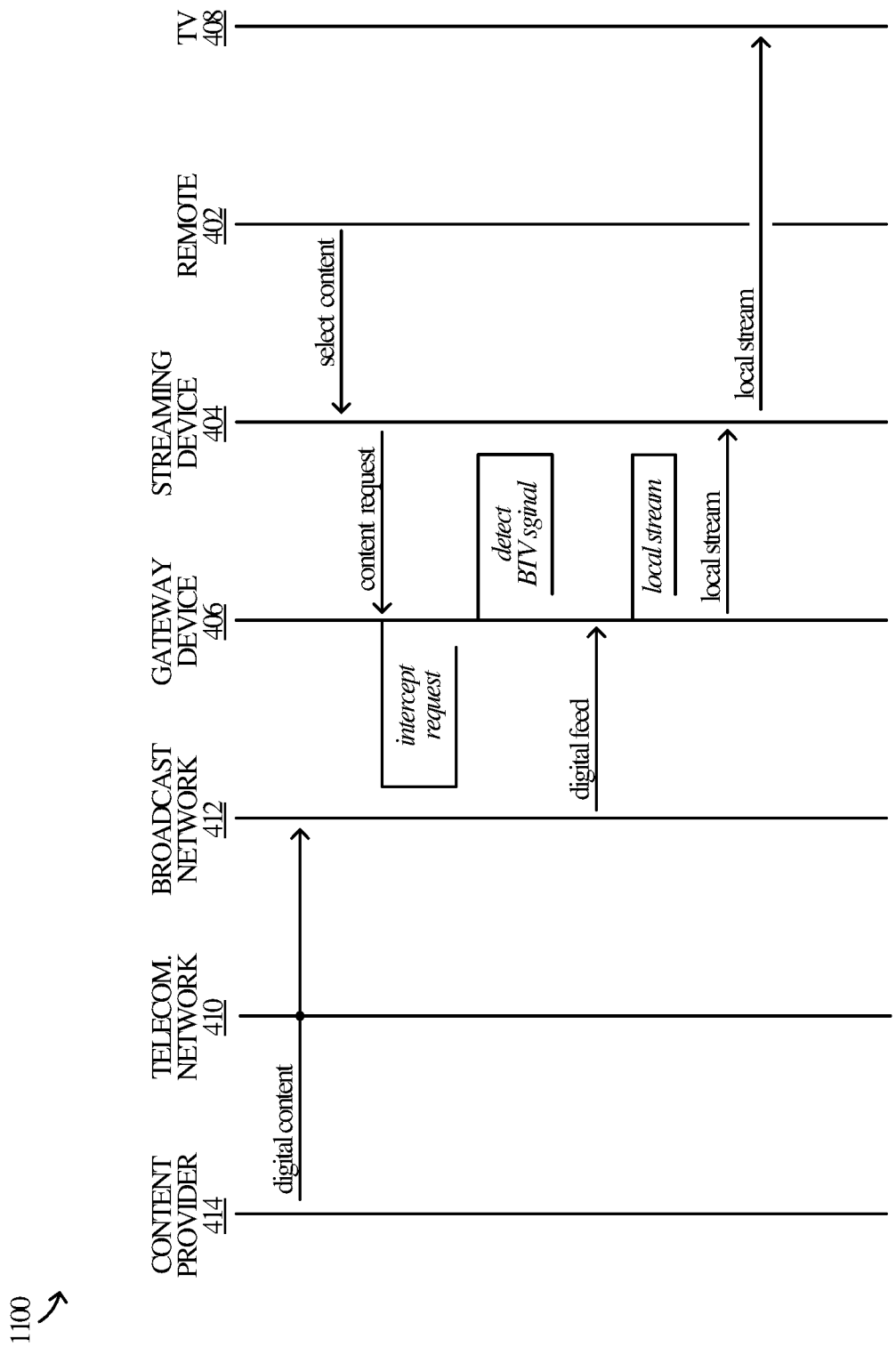
FIG. 11 illustrates an operational scenario in an implementation.

FIG. 11 illustrates a brief operational scenario 1100 in an implementation in which gateway device 406 intercepts a request for streamed content and automatically obtains the content from an over-the-air source (e.g., a broadcast television signal). Specifically, content provider 414 transmits digital content to broadcast network 412 via telecommunications network 410. Next, a viewer uses remote-control 402 to select a user interface element for viewing digital content. Subsequent to receiving the user's selection, streaming device 404 transmits a request for the digital content to content provider 414. However, gateway device 406 intercepts the request (e.g., via a server of gateway device 406) and identifies the digital content of the request. Gateway device 406 may identify the digital content based on a name of the content, a name of the content provider, a distribution source of the content, etc. Subsequent to identifying the digital content, gateway device 406 detects an over-the-air source of content in a broadcast television signal. Gateway device 406 may detect the over-the-air source based on the intercepted request, by looking up an identity of the content, broadcast television signal, and the like in a database, spreadsheet, table, or other repository.

Responsive to detecting the over-the-air source of the content, gateway device 406 obtains an over-the-air version of the content from a digital feed of the broadcast television signal transmitted by broadcast network 412. Gateway device 406 generates a local stream of the over-the-air version and transmits the local stream to streaming device 404. Finally, streaming device 404 sends the local stream to television 408 for display.

Figure 12:
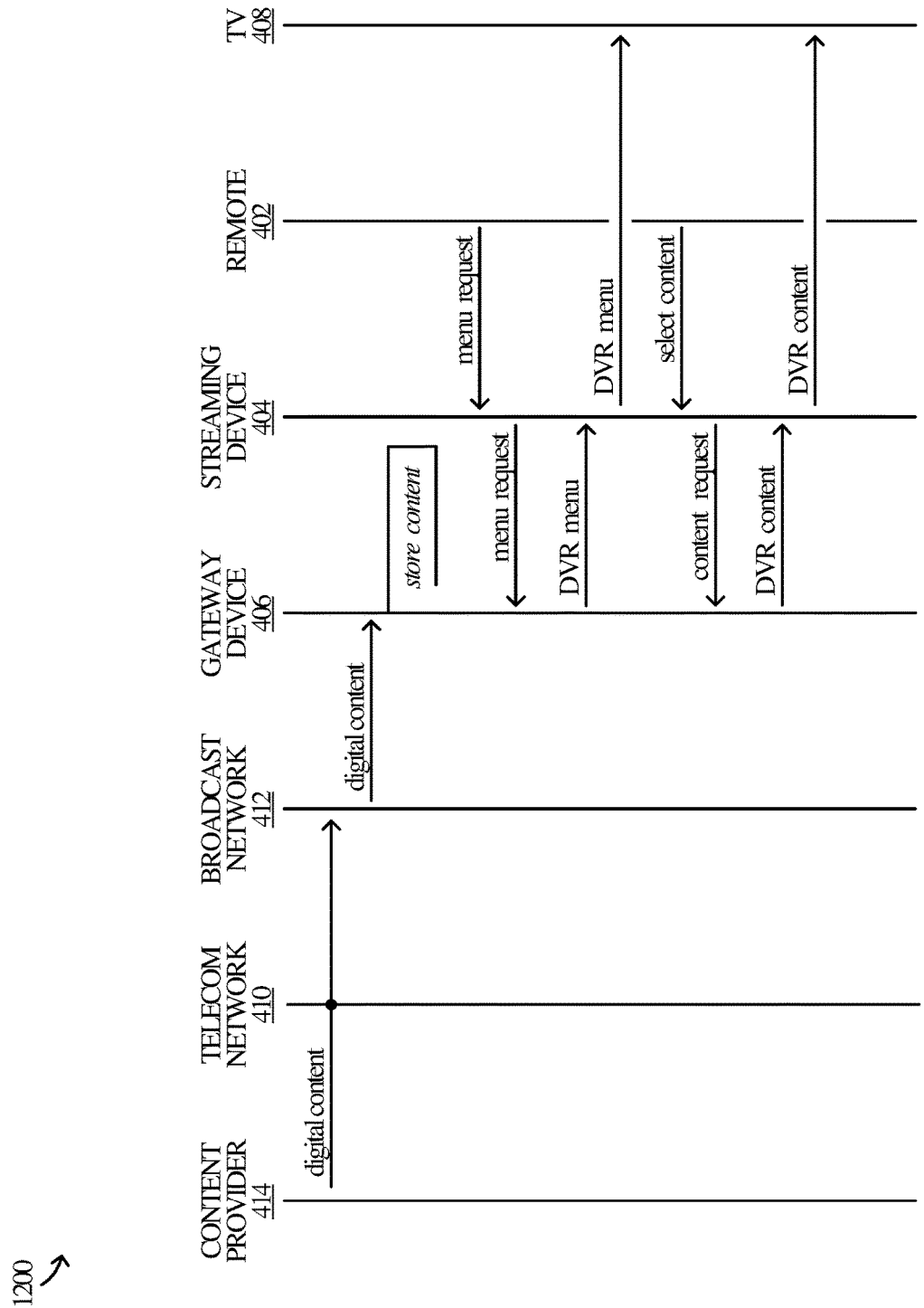
FIG. 12 illustrates an operational scenario in an implementation.

FIG. 12 illustrates a brief operational scenario 1200 in an implementation in which gateway device 406 stores digital content locally for later streaming upon request. Specifically, content provider 414 transmits digital content to broadcast network 412 via telecommunications network 410. Though, content provider 414 is depicted as transmitting the digital content to broadcast network 412, it is also contemplated herein that a different content provider transmits the digital content to broadcast network 412.

Gateway device 406 obtains the digital content from a broadcast television signal transmitted by broadcast network 412. Gateway device 406 stores the digital content locally (e.g., in a memory of gateway device 406) for later streaming upon request from the streaming device. The locally stored content is referred to herein as Digital-Video-Recorder (DVR) content.

Next, a viewer uses remote-control 402 to select a user interface element for browsing available DVR content. Subsequent to receiving the user's selection, streaming device 404 transmits to gateway device 406 a request for a menu of available DVR content. Gateway device 406 then transmits to streaming device 404 the menu of available DVR content.

Streaming device 404 next transmits the menu to television 408 for display in a user interface of television 408. The viewer uses remote-control 402 to select a user interface element for viewing DVR content listed in the DVR menu. Subsequent to receiving the user's selection, streaming device 404 transmits to gateway device 406 a request for the DVR content. Responsive to the request, gateway device 406 accesses the DVR content in local memory and transmits the DVR content to streaming device 404. Streaming device 404 then transmits the DVR content to television 408 for display.

Figure 13A:
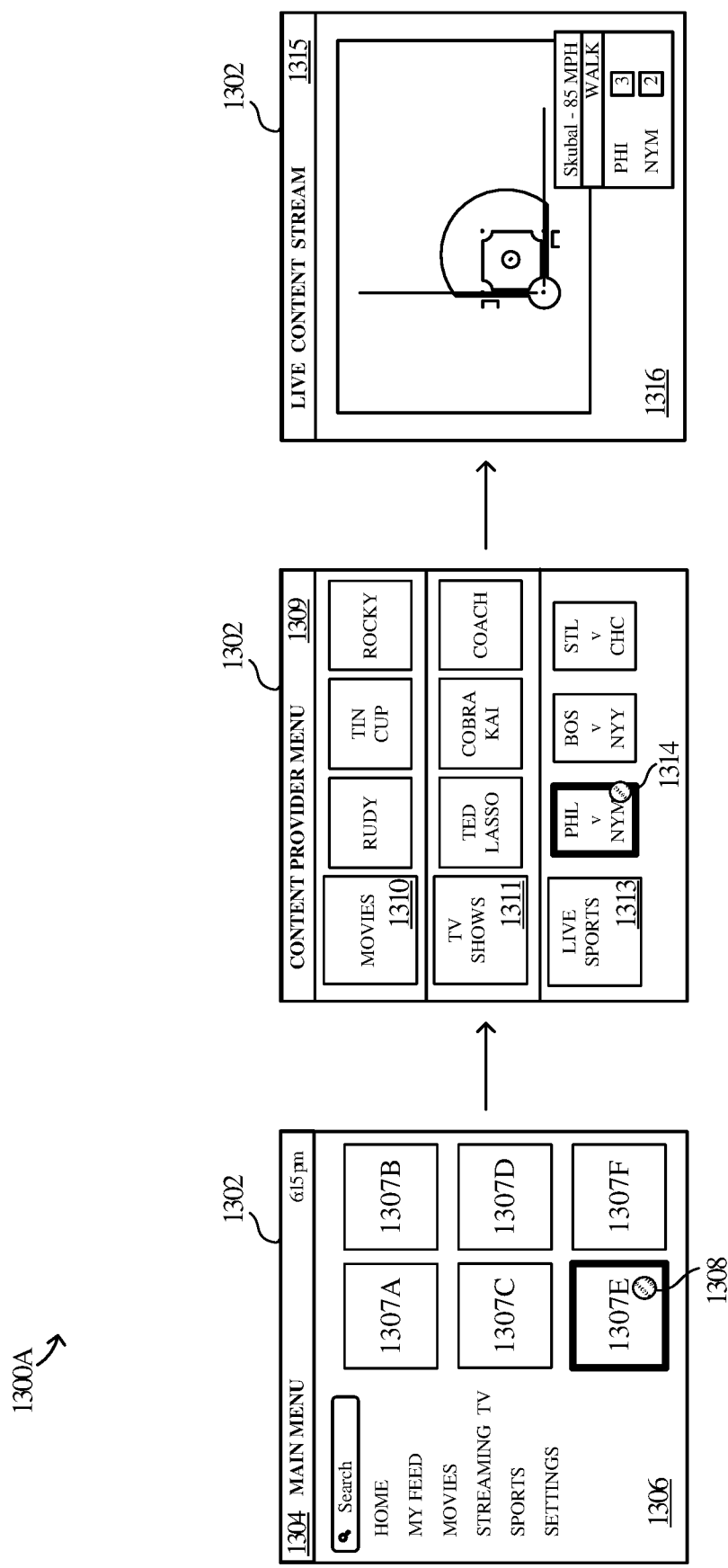
FIG. 13A illustrates a user interface in an implementation.

FIG. 13A illustrates a brief operational scenario 1300A in which a computing device (not shown) surfaces user interface 1302. Initially, user interface 1302 includes main menu 1304 of a streaming service (e.g., Roku®). Main menu 1304 includes canvas 1306. Canvas 1306 includes an application search bar, a list of selectable text-elements for browsing categories of content (e.g., my feed, movies, sports, etc.), and content provider icons 1307A-F. Content provider icons 1307A-F are selectable for accessing the digital content of corresponding content providers. Canvas 1306 also includes user selection 1308 of content provider icon 1307E. User selection 1308 may be made using a mobile telephone, gesture control system and device, universal remote, voice-controlled remote, and the like.

Responsive to user selection 1308, the computing device (not shown) transitions user interface 1302 from main menu 1304 to content provider menu 1309. Content provider menu 1309 includes a list of sports movies 1310, a list of sports television shows 1311, and a list of live streamed sports 1313. Content provider menu 1309 also includes user selection 1314 of one of the live-streamed sports (i.e., Philadelphia Phillies vs. New York Mets). User selection 1314 may be made using a mobile telephone, gesture control system and device, universal remote, voice-controlled remote, and the like.

Responsive to user selection 1314, the computing device (not shown) transitions user interface 1302 from content provider menu 1309 to live content stream 1315. Live content stream 1315 includes canvas 1316 on which a live stream of a baseball game is displayed. The live stream of the baseball game is being transmitted by the content provider.

Figure 13B:
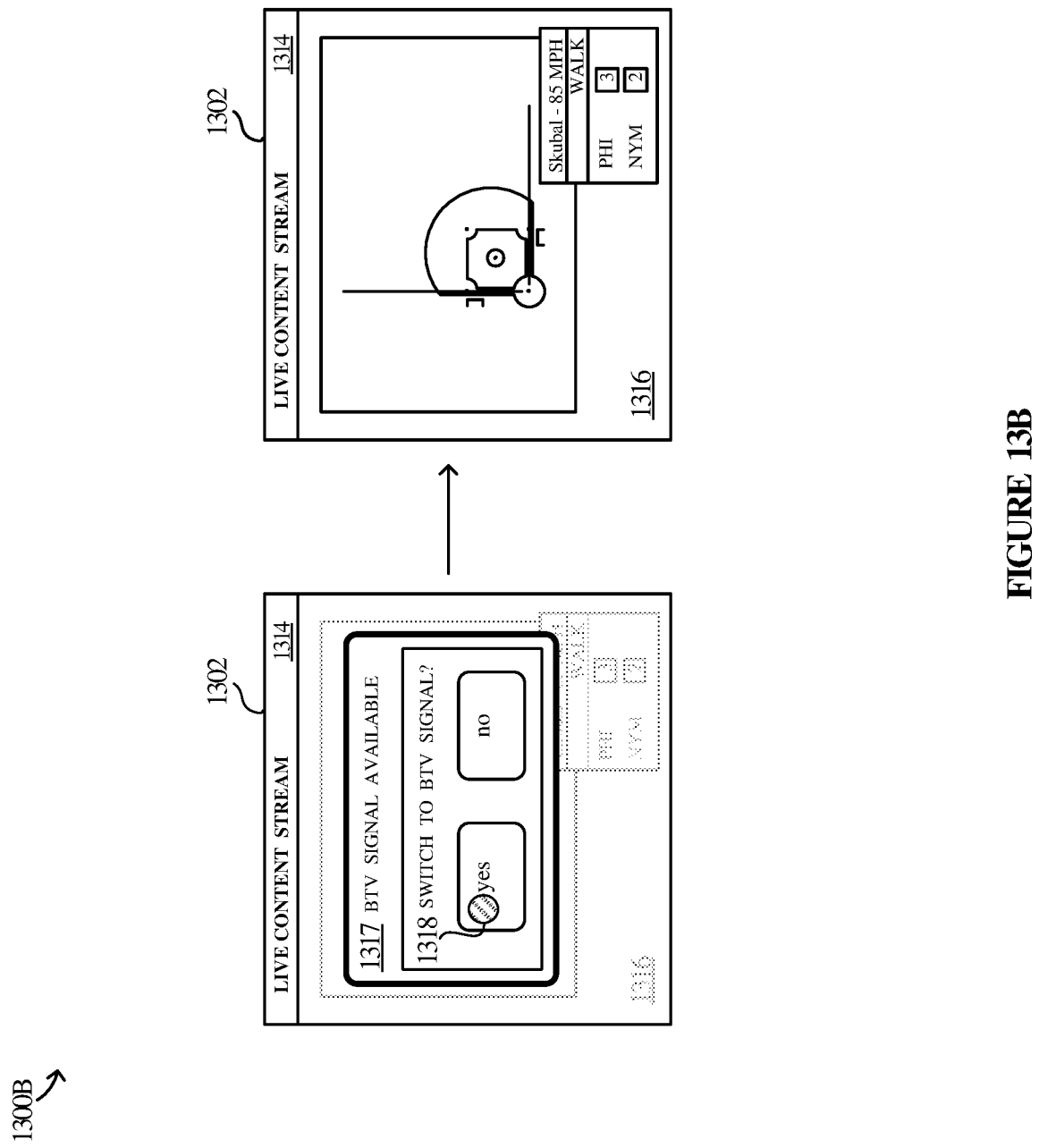
FIG. 13B illustrates a user interface in an implementation.

FIG. 13B illustrates a brief operational scenario 1300B in which the computing device of FIG. 13A (not shown) surfaces prompt 1317 in user interface 1302. Prompt 1317 may be surfaced by the computing device responsive to a decrease in available bandwidth, an increase in congestion, or other causes of stain on a cell of a wireless telecommunications network. Prompt 1317 may also be surfaced responsive to redirection of a request for content, detection of a presence of an over-the-air broadcast of the requested content, and the like. Prompt 1317 informs a viewer that an over-the-air broadcast of the streamed content (i.e., the baseball game) is available. Prompt 1317 further asks the viewer to switch to the over-the-air broadcast of the streamed content.

A response to prompt 1317 is received via user input 1318, which selects the "yes" element of prompt 1317. Responsive to user input 1318, the computing device (not shown) stops receiving the live stream of the baseball game from the content provider and begins to receive the live stream of the baseball game from the over-the-air broadcast. User input 1318 may be made using a mobile telephone, gesture control system and device, universal remote, voice-controlled remote, and the like.

FIG. 14 illustrates computing device 1401 that is representative of any system or collection of systems in which the various processes, programs, services, and scenarios disclosed herein may be implemented. Examples of computing device 1401 include, but are not limited to, gateway devices, streaming devices, Internet-enabled televisions, desktop and laptop computers, tablet computers, mobile computers, and mobile phones.

Computing device 1401 may be implemented as a single apparatus, system, or device or may be implemented in a distributed manner as multiple apparatuses, systems, or devices. Computing device 1401 includes, but is not limited to, processing system 1402, storage system 1403, software 1405, communication interface system 1407, and user interface system 1409 (optional). Processing system 1402 is operatively coupled with storage system 1403, communication interface system 1407, and user interface system 1409.

Processing system 1402 loads and executes software 1405 from storage system 1403. Software 1405 includes and implements streaming process 1406, which is representative of the streaming processes discussed with respect to the preceding Figures, such as streaming process 200. When executed by processing system 1402, software 1405 directs processing system 1402 to operate as described herein for at least the various processes, operational scenarios, and sequences discussed in the foregoing implementations. Computing device 1401 may optionally include additional devices, features, or functionality not discussed for purposes of brevity.

Referring still to FIG. 14, processing system 1402 may comprise a micro-processor and other circuitry that retrieves and executes software 1405 from storage system 1403. Processing system 1402 may be implemented within a single processing device but may also be distributed across multiple processing devices or sub-systems that cooperate in executing program instructions. Examples of processing system 1402 include general purpose central processing units, graphical processing units, application specific processors, and logic devices, as well as any other type of processing device, combinations, or variations thereof.

Storage system 1403 may comprise any computer readable storage media readable by processing system 1402 and capable of storing software 1405. Storage system 1403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1403 may also include computer readable communication media over which at least some of software 1405 may be communicated internally or externally. Storage system 1403 may be implemented as a single storage device but may also be implemented across multiple storage devices or sub-systems co-located or distributed relative to each other. Storage system 1403 may comprise additional elements, such as a controller, capable of communicating with processing system 1402 or possibly other systems.

Software 1405 (including streaming process 1406) may be implemented in program instructions and among other functions may, when executed by processing system 1402, direct processing system 1402 to operate as described with respect to the various operational scenarios, sequences, and processes illustrated herein. For example, software 1405 may include program instructions for implementing a streaming process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1405 may include additional processes, programs, or components, such as operating system software, virtualization software, or other application software. Software 1405 may also comprise firmware or some other form of machine-readable processing instructions executable by processing system 1402.

In general, software 1405 may, when loaded into processing system 1402 and executed, transform a suitable apparatus, system, or device (of which computing device 1401 is representative) overall from a general-purpose computing system into a special-purpose computing system customized to support streaming features, functionality, and user experiences. Indeed, encoding software 1405 on storage system 1403 may transform the physical structure of storage system 1403. The specific transformation of the physical structure may depend on various factors in different implementations of this description. Examples of such factors may include, but are not limited to, the technology used to implement the storage media of storage system 1403 and whether the computer-storage media are characterized as primary or secondary storage, as well as other factors.

For example, if the computer readable storage media are implemented as semiconductor-based memory, software 1405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of streaming applications and services, they apply as well to other contexts such as productivity applications and services, virtual and augmented reality applications and services, business applications and services, and other types of software applications, services, and environments.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A gateway device comprising:
   one or more computer readable storage media;
   one or more processors operatively coupled with the one or more computer readable storage media; and
   program instructions stored on the one or more computer readable storage media that, when executed by the one or more processors, direct the gateway device to at least:
   establish an Internet connection via a telecommunications network, and send and receive Internet traffic over the Internet connection to and from devices connected to the gateway device via a local area network (LAN), wherein the Internet traffic includes content streamed to a device on the LAN from a content provider on the Internet, wherein the device comprises a streaming device connected to or integrated into a display device;
   detect congestion on the telecommunication network exceeds a threshold level of congestion; and
   subsequent to detecting that the congestion exceeds the threshold level of congestion:
   generate and transmit a prompt to the streaming device that requests permission to switch from receiving the content streamed from the content provider to obtaining digital content from a broadcast television signal;
   in response to receiving the permission from the streaming device, obtain the digital content from the broadcast television signal, wherein the digital content comprises a same content type as the content streamed from the content provider;
   generate a local stream of the digital content; and
   switch from transmitting the content received over the Internet connection to transmitting the local stream of the digital content obtained from the broadcast television signal to the streaming device.

2. The gateway device of claim 1 wherein the digital content and the content streamed from the content provider comprise live content.

3. The gateway device of claim 1 wherein the threshold level of congestion comprises at least one of a packet loss, delay, jitter, time, or queue-limit metric.

4. The gateway device of claim 1 wherein the program instructions further direct the gateway device to instruct the streaming device to cease the content streamed from the content provider to the device responsive to the congestion exceeding the threshold level of congestion.

5. The gateway device of claim 1 wherein the program instructions direct the gateway device to obtain the digital content responsive to a request for the content sent by the streaming device over the Internet connection to a content provider, wherein content provider, responsive to the request, redirects the streaming device to send the request to a server hosted on the gateway device.

6. The gateway device of claim 5 wherein the program instructions, responsive to the request for the content sent by the streaming device, direct the gateway device to identify the broadcast television signal based on an identity of the content.

7. The gateway device of claim 1 wherein the program instructions further direct the gateway device to store the digital content locally for later streaming upon request to the gateway device.

8. The gateway device of claim 1 wherein the telecommunications network comprises a Fifth Generation New Radio network, and wherein the broadcast television signal comprises an Advanced Television Systems Committee signal.

9. A method of operating a gateway device, the method comprising:
   establishing an Internet connection via a wireless network;
   sending and receiving Internet traffic over the Internet connection to and from devices connected to the gateway device via a local area network (LAN), wherein the Internet traffic includes content streamed to a device on the LAN from a content provider on the Internet, wherein the device comprises a streaming device connected to or integrated into a display device; and
   in response to determining congestion on the telecommunication network exceeds a threshold level of congestion:
   generating and transmitting a prompt to the streaming device that requests permission to switch from receiving the content streamed from the content provider to obtaining digital content from a broadcast television signal;

in response to receiving the permission from the streaming device, obtaining the digital content from the broadcast television signal, wherein the digital content comprises a same content type as the content streamed from the content provider;

generating a local stream of the digital content; and switching from transmitting the content received over the Internet connection to transmitting the local stream of the digital content obtained from the broadcast television signal to the streaming device.

10. The method of claim 9 wherein the digital content and the content streamed from the content provider comprise live content.

11. The method of claim 9 wherein the threshold level of congestion comprises at least one of a packet loss, delay, jitter, time, or queue-limit metric.

12. The method of claim 9 further comprising instructing the streaming device to cease the content streamed from the content provider to the device responsive to the congestion on the wireless network exceeding the threshold level of congestion.

13. The method of claim 9 wherein obtaining the digital content occurs responsive to a request for the content sent by the device over the Internet connection to the content provider that is redirected from the content provider to a server hosted on the gateway device.

14. The method of claim 13 further comprising, responsive to the request for the content sent by the device, identifying the broadcast television signal based on an identity of the content indicated in the request.

15. The method of claim 9 further comprising storing the digital content locally for later streaming upon request to the device.

16. The method of claim 9 wherein the wireless network comprises a Fifth Generation New Radio network, and wherein the broadcast television signal comprises an Advanced Television Systems Committee signal.

17. A gateway system comprising:

a digital streaming device; and gateway device circuitry coupled with the digital streaming device over a local area network (LAN), the gateway device circuitry to:

provide an Internet connection to the digital streaming device, wherein the digital streaming device obtains streamed content over the Internet connection;

receive Internet traffic via a cellular telecommunications network, wherein the Internet traffic includes a remote stream of the content sent from a content provider to the gateway device;

transmit the remote stream of the content to the digital streaming device on the LAN;

detect congestion on the telecommunication network exceeds a threshold level of congestion; and subsequent to detecting that the congestion exceeds the threshold level of congestion:

generate and transmit a prompt to the digital streaming device that requests permission to switch from receiving the remote stream of the content to obtaining a digital feed of the content from a broadcast television signal;

in response to receiving the permission from the digital streaming device, obtain the digital feed of the content from the broadcast television signal;

generate a local stream of the content based on the digital feed; and switch from transmitting the content received over the Internet connection to transmitting the local stream of the content obtained from the broadcast television signal to the digital streaming device over the LAN.

18. The gateway system of claim 17 wherein the content comprises live content.

19. The gateway system of claim 18 wherein the threshold level of congestion comprises at least one of a packet loss, delay, jitter, time, or queue-limit metric.

20. The gateway system of claim 17 wherein the gateway device circuitry is to further obtain the digital feed responsive to a request for the content sent by the digital streaming device over the Internet connection to a content provider that is redirected from the content provider to a server hosted on the gateway device.

* * * * *